Figure 1:
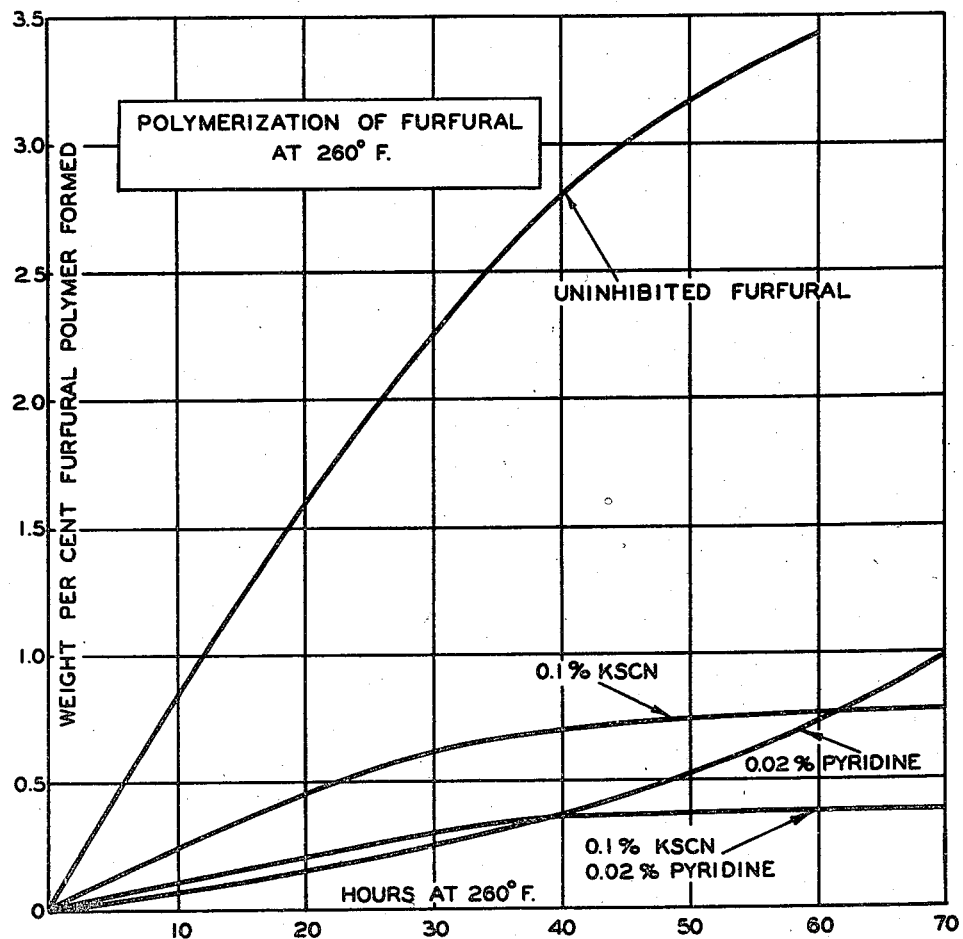

Patented Apr. 27, 1948

2,440,451

UNITED STATES PATENT OFFICE 2,440,451

INHIBITING POLYMERIZATION OF FURFURAL

Walter A. Schulze and John C. Hillyer, Bartlesville, Okla., assignors to Phillips Petroleum Company, a corporation of Delaware Application March 26, 1945, Serial No. 584,983

12 Claims. (Cl. 260—347)

This invention relates to a method for inhibiting polymerization of furfural. More specifically, this invention relates to the addition of mixtures of selected inorganic and organic compounds to furfural to inhibit the formation of polymeric materials when said furfural is subjected to elevated temperatures. Still more specifically this invention is concerned with the use of mixtures of inorganic thiocyanates and pyridine or its alkyl homologs as agents for preventing or greatly retarding the formation of high-boiling resins, tars, aldehyde condensation products and other non-volatile substances in furfural solvents as applied to various commercial processes. The present invention is particularly concerned with the problem of inhibiting furfural polymerization in those processes wherein the furfural is maintained at elevated temperatures over extended periods of time or under conditions conducive to the formation of resinous materials.

Furfural is employed in large quantities in numerous commercial processes. Its use as a selective solvent for the segregation of compounds or groups of compounds, whose volatilities lie so close together that other methods of separation are impractical or inadequate, is well known. In the refining of lubricating oils, for example, undesirable olefinic and diolefinic hydrocarbon constituents may be separated from the paraffinic and naphthenic hydrocarbons through the use of furfural. Similarly, in the refining of natural drying oils employed in paints, various dissimilar fractions which have characteristics superior to the original mixture may be obtained. Furfural is also widely used in the refining of resins such as rosin and its modifications and derivatives. Furfural has also come into extensive use in extractive distillation processes wherein the volatilities of close-boiling compounds are altered sufficiently to enable separations to be effected satisfactorily in commercial fractionators or super-fractionators. Thus, from C4 hydrocarbon fractions produced in refinery operations such as catalytic or thermal cracking, there may be obtained streams of substantially pure n-butenes, butadiene and olefin-free normal and isobutane streams. The dehydrogenation of n-butane yields n-butenes which may be separated from the butane by furfural extractive distillation to yield a recycle stream substantially free from unsaturates. Similarly, products resulting from the dehydrogenation of n-butenes may be segregated to give essentially complete recovery of 1,3-butadiene in the state of purity required for the manufacture of synthetic rubber and yield a stream of substantially diolefin-free butenes for recycling to the catalyst. Other applications of the selective action of furfural are numerous. Our invention is applicable wherever furfural is used under such conditions that polymerization thereof occurs.

In the various commercial processes utilizing the selective solvent action of furfural, elevated temperatures are maintained over an extended period as the solvent circulates throughout the system. While furfural is known to darken fairly rapidly when stored at atmospheric temperatures, with the resultant formation of tarry or resinous polymerization products, the formation of said polymeric materials is greatly accelerated as the temperature is increased. In commercial systems the temperature is often maintained at about 200–300° F. or higher thereby promoting the formation of tarry products which accumulate in vital parts of the equipment such as valves, pumps, heat exchanger tubes and the like, and seriously interfere with flow and operation of the process. In extreme cases polymer formation may occur to such an extent as to block transfer lines. In addition to operational difficulties the selectivity of the solvent is markedly decreased and may render the desired separation unsatisfactory or even impossible.

In order to avoid the operating difficulties inherent in furfural-extraction systems and to maintain the solvent selectivity at a high level, it has heretofore been necessary to provide facilities for the removal of polymeric materials. Polymer removal has been accomplished by installing means for periodic distillation of the solvent or a continuous distillation system has been provided whereby a sufficient portion of the circulating stream is distilled at such a rate as to keep the polymer content below a certain level. Methods now in use for purifying furfural used in recovery of butene and butadiene from C4 hydrocarbon streams are described in detail in the copending application of Hachmuth, Ser. No. 460,874 which issued April 3, 1945 as Patent No. 2,372,668, and in U. S. patents to Buell et al., 2,350,584, and Hachmuth, 2,350,609. The methods hitherto proposed accomplish satisfactory elimination of the polymer but at the same time there is entailed an appreciable loss in the volume of solvent. The cost of replacing the solvent often becomes a major factor in the total operating cost and may be sufficient to render the process commercially unattractive. While certain operating difficulties may account for losses in the furfural, it has been found that the formation of heavy polymer is responsible for the major portion of the loss. Complete or partial elimination of polymer formation is highly desirable and the accomplishment of this objective would constitute a valuable advance in the art of furfural extraction processes.

Our invention is particularly applicable to furfural used as the solvent in the extractive distillation of aliphatic hydrocarbon streams to recover unsaturated hydrocarbons therefrom such as olefins and/or diolefins, for example, normal butene and/or butadiene from C₄ hydrocarbon streams, this being the principal if not the only present commercial application of extractive distillation with furfural as a means of recovering unsaturated hydrocarbons. However, our invention may be applied wherever furfural is used as the solvent in the recovery by extractive distillation of other aliphatic olefins or aliphatic conjugated diolefins from hydrocarbon streams containing the same.

In extractive distillation, solvent extraction is combined with continuous fractional distillation, the furfural being supplied continuously to the top of the column and descending therein and the hydrocarbon feed being supplied to an intermediate point in the column and being vaporized upwardly countercurrently to the furfural, there being provided the usual bubble trays or packing, a reboiler at the bottom of the column and means for condensing overhead vapors and returning condensate as reflux to the top of the column. The separation of butadiene in this manner is described in copending applications of Hachmuth, Ser. No. 454,312, filed August 10, 1942, which issued January 28, 1947 as Patent No. 2,415,006, and Ser. No. 438,844, filed Apr. 13, 1942 which issued January 20, 1948 as Patent No. 2,434,796. The latter application also discloses the separation of normal butene from normal butane and is directed to the use of a solvent consisting of furfural containing dissolved water in amount ranging from 1% up to saturation which substantially lowers the boiling temperature of the furfural. The temperature at the bottom of the extractive distillation column is the boiling point of the liquid at that point under the operating pressure of the column. The operating pressure is sufficiently high to permit condensation of a portion of the overhead vapors for reflux. The liquid in the bottom of the absorption column is composed of furfural having dissolved therein water and the selectively absorbed hydrocarbon. This bottoms liquid is withdrawn and introduced into another column at a point near the top. In this second column the dissolved unsaturated hydrocarbons are stripped out of the top and the lean furfural bottom liquid is cooled and returned to the absorption column. The stripper column is provided with a reboiler at its bottom and means for refluxing with condensed overhead. The temperature at the bottom of the stripping column is the boiling point of the liquid at that point under the column operating pressure. Ordinarily the furfural absorber and stripper are operated with bottom temperatures of 300–325° F. and under pressures of 50–65 pounds per square inch gauge. In the furfural re-run unit which operates continuously on a sidestream of the lean furfural, temperatures of 200–300° F. and pressures ranging from atmospheric to 40 pounds per square inch gauge are commonly maintained. Thus, it will be seen that the furfural is continuously being subjected to repeated vaporization at relatively high temperatures. The combined influence of heat, pressure, iron and iron salts, acids, moisture and hydrocarbons, especially olefins or diolefins, and other factors as yet but little understood brings about the polymerization of the furfural. Due to the scarcity and high cost of furfural the loss in this manner has been a most serious problem. This problem is made more serious because the best available information to date indicates that the polymerization of furfural is auto-catalytic.

It is an object of the present invention to provide a method of inhibiting the formation of high-boiling resins, tars and other non-volatile materials in furfural.

It is also an object of the invention to provide a means for reducing the accumulation of heavy tar deposits in furfural extractive distillation systems operated at elevated temperatures.

It is a further object to maintain the furfural in a high state of selectivity in extractive distillation systems while simultaneously preventing or reducing polymer formation in said systems.

It is a still further object to reduce the formation of polymeric materials in furfural through the addition of inhibitors comprising mixtures of alkali metal thiocyanates with pyridine or its alkyl derivatives.

The accompanying drawings compare graphically the use of a mixture of inhibitors in accordance with the present invention and the use of the same inhibitors alone.

Heretofore no practical process for reducing or retarding the rate of polymer formation in furfural has been advanced. The addition of small quantities of antioxidants, particularly pyrogallol, has been proposed but this expedient has not been found to give satisfactory results in commercial operations. While it is known that oxygen promotes resin formation in furfural, oxygen-containing gases are excluded from substantially all commercial units. Anti-oxidants, therefore, exert no protective function against resin formation which proceeds rapidly at elevated temperatures in systems from which oxygen is excluded. In fact, conventional anti-oxidants such as phenols and amino compounds are known to react with furfural at elevated temperatures, to form non-volatile products, thus accounting for appreciable solvent loss as well as accumulation of large quantities of solid materials. In our copending application, Serial No. 584,982, filed March 26, 1945, we have shown that the addition of minor amounts of thiocyanates of alkali metals inhibit polymer formation in furfural to a considerable extent; however, generally a small but appreciable rate of polymerization persists after the inhibitor has exerted its full effect. Similarly, in our copending application, Serial No. 584,981, filed Mar. 26, 1945, the use of pyridine or an alkyl homolog thereof as a polymerization inhibitor in furfural is disclosed.

We have now found that whereas alkali metal thiocyanates and pyridine and its alkyl homologs (alkyl pyridines) separately exert an excellent inhibiting influence on the polymerization of furfural, a combination of these inhibitor types is unexpectedly more efficacious than either type alone. Thus in the treatment of commercial furfural solvents we often prefer to employ an inhibitor mixture comprising a compound selected from the group of alkali metal thiocyanates together with a compound selected from the group of heterocyclic nitrogen bases consisting of pyridine and its alkyl homologs. While the preferred thiocyanates of the present invention are those of sodium and potassium, other alkali metal thiocyanates may be used.

The term "alkali metal thiocyanate" as used herein is intended to include ammonium thiocyanate. Ammonium thiocyanate is generally satisfactory but in some instances there may be present in the furfural some alkaline compound which may result in the liberation of a small amount of ammonium hydroxide which is objectionable because it reacts with furfural and therefore some slight risk is involved in using ammonium thiocyanate in all cases.

Pyridine and its methyl derivatives (the picolines) are most generally employed in admixture with the thiocyanates although other alkyl derivatives of pyridine such as the lutidines, collidines, and parvolines are included within the scope of this disclosure.

The following compounds may be used in accordance with the present invention:

| Compound | B. P., °C. |
| --- | --- |
| Pyridine | 115 |
| 2-Methyl Pyridine | 129 |
| 3-Methyl Pyridine | 143 |
| 4-Methyl Pyridine | 143 |
| 2,4-Dimethyl Pyridine | 157 |
| 2,5-Dimethyl Pyridine | 156 |
| 2,6-Dimethyl Pyridine | 142 |
| 3,4-Dimethyl Pyridine | 163 |
| 2-Ethyl Pyridine | 149 |
| 3-Ethyl Pyridine | 165 |
| 4-Ethyl Pyridine | 166 |
| 2-Methyl-4-Ethyl Pyridine | 178 |
| 4-Methyl-3-Ethyl Pyridine | 195 |
| 2,4,6-Trimethyl Pyridine | 171 |
| 2,4-Diethyl Pyridine | 188 |
| 3,4-Diethyl Pyridine | 209[1] |

[1] At 710 mm.

Instead of the pure pyridine or alkyl pyridine we may use mixtures of alkyl pyridines both isomeric and non-isomeric, or mixtures of one or more alkyl pyridines with pyridine. We may use commercial pyridine or alkyl pyridines. We may use mixtures of pyridine and alkyl pyridines or of alkyl pyridines available commercially either now or in the future either synthetic or naturally occurring such as certain pyridine and/or alkyl pyridine fractions recovered from coke oven gases, coal tar, bone oil, shale oil, etc. The inhibitor compound or mixture may be contaminated with other materials which are not harmful and which may actually possess an inhibiting action such as quinoline and its alkyl homologs. The use of quinoline and its alkyl homologs as furfural inhibitor is disclosed and claimed in the copending joint application of applicant Hillyer and D. A. Nicewander, Serial No. 584,984, filed Mar. 26, 1945. Particular care should be taken that any pyridine and/or alkyl pyridine material used in carrying out the present invention be free from piperidine, isoquinoline, morpholine and aliphatic and aromatic amines since these compounds are very unsatisfactory because they react with furfural and/or catalyze the formation of polymer.

While pyridine is very effective as a polymerization inhibitor for furfural it possesses the disadvantage that its boiling point differs appreciably from that of furfural and therefore in any operating system some separation of the two is likely. The pyridine might thus be lost in a continuous rerunning operation or become concentrated in certain parts of the operating system while at other points little inhibitor would be present. An inhibitor of more nearly the same boiling point as furfural is desirable. Alphamethyl pyridine (2-methyl pyridine or α-picoline) boils at 129° C. compared with 162° C. for dry furfural and appears more suitable than pyridine under such circumstances. Where dissolved water is present in the furfural, as is usually the case in commercial installations, the pyridine or alkyl pyridine and furfural may have their volatilities changed by the water due to the tendency to form azeotropes of the minimum-boiling type but this is advantageous since for example, in the case of pyridine, its azeotrope with water boils at 92.6° C. or only about 5 degrees centigrade below the boiling point of the azeotrope of furfural with water whereas dry pyridine boils at 115° C. or 37 degrees centigrade below dry furfural. The present invention is particularly applicable to furfural containing dissolved water in amount ranging from 1% up to saturation.

While we have found that either thiocyanates or pyridine and its alkyl derivatives exert certain inhibiting effects on furfural polymerization, these effects are greatly enhanced through the use of mixtures of said compounds. The mixed inhibitor systems of the present invention not only greatly reduce the polymerization rate but the effect persists over a relatively longer period than when either component of the system is used alone. Furthermore, the degree of reduction achieved with mixed inhibitors is not obtainable simply by the addition of molal quantities of either the thiocyanate or the pyridine equivalent to the total of the combined system and frequently the addition of even much larger quantities of either component falls far short of the results accomplished when the two-component inhibitor is employed. In Fig. 1 of the accompanying drawings the effect of both single and mixed inhibitors is shown graphically. The increased effective inhibitor life resulting from the use of the KSCN-pyridine mixture is clearly demonstrated.

In Fig. 1, there are portrayed the results of a laboratory study of the action of pyridine and potassium thiocyanate both singly and in admixture in inhibiting polymerization of furfural which had been accelerated with iron in the form of ferric chloride and hydrogen chloride. To a lot of pure steam distilled furfural there was added concentrated hydrochloric acid in amount such as to give a concentration of 0.0036 weight per cent of hydrogen chloride and 0.03 per cent by weight of ferric chloride in order to accelerate polymerization of the furfural. To one set of samples of the accelerated furfural there was added 0.02 per cent by weight of pyridine. To a second set was added 0.1 per cent by weight of potassium thiocyanate. To a third set there were added 0.02 per cent of pyridine and 0.1 per cent of potassium thiocyanate. A fourth set of uninhibited samples of the accelerated furfural was prepared for purposes of comparison. The four sets of samples were placed in sealed tubes and subjected to heating at 260° F. for varying periods, the quantity of polymer formed being determined and plotted as shown. The addition of accelerators, ferric chloride and hydrogen chloride, was for the purpose of simulating plant conditions in the laboratory. Uninhibited pure furfural does not polymerize nearly so rapidly as uninhibited plant furfural such as furfural from an extractive distillation system. It is known that the plant furfural contains iron salts and substantial acidity and it has been found possible in the laboratory to approximate the effect of these by the addition of ferric chloride and hydrogen chloride to pure steam distilled furfural.

Figure 2:
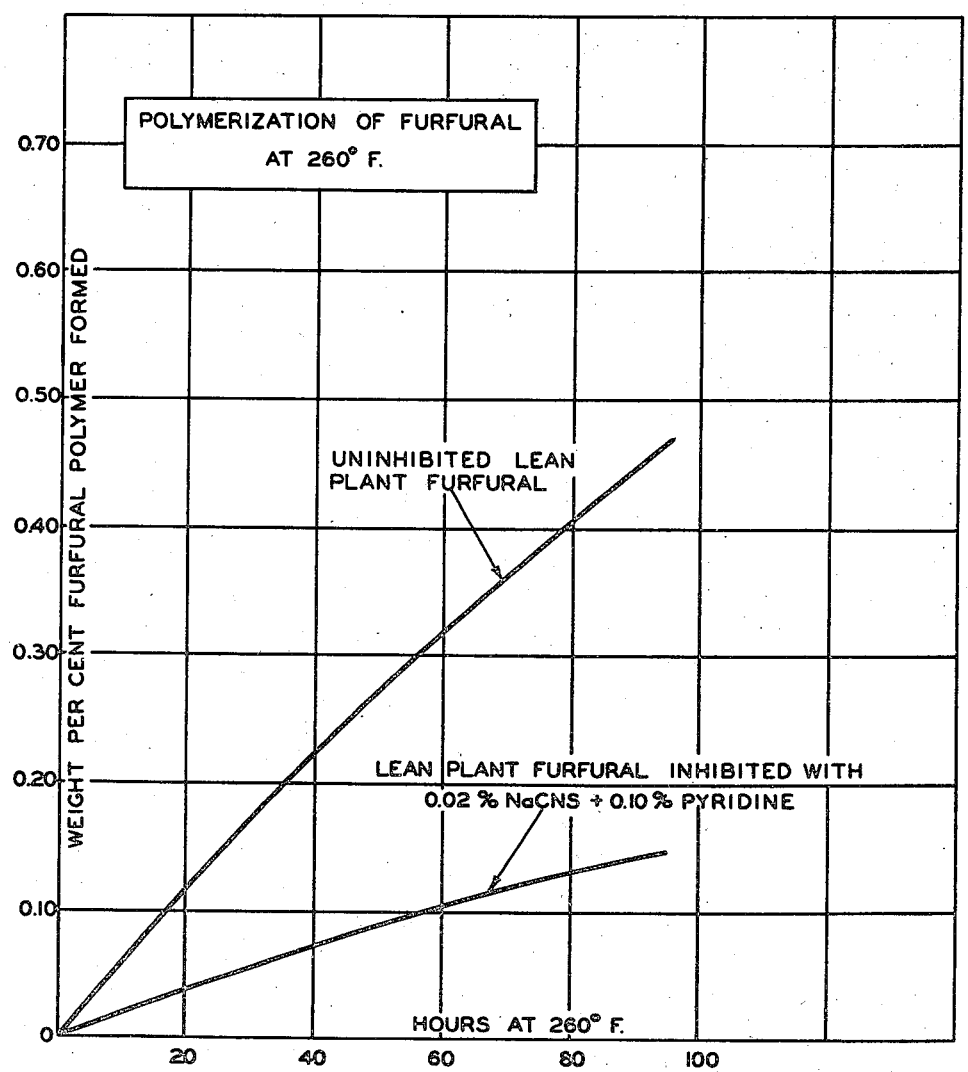

In Fig. 2, there is shown the inhibiting action of a mixture of 0.02 per cent sodium thiocyanate and 0.10 per cent pyridine on unaccelerated lean furfural obtained from the circulating furfural stream in an extractive distillation system used in the recovery of normal butene and butadiene from C₄ streams containing same.

The inhibitor may be added to the system by any convenient means. A solution of the thiocyanate in water may be prepared, the pyridine added and the resulting mixture introduced into the circulating solvent or the aqueous solution of thiocyanate and the pyridine may be added as two separate streams. An alternate procedure may be followed in which powdered thiocyanate is introduced directly.

The quantity of inhibitor required depends upon the rate of polymerization of the solvent in the system under consideration. Among the factors affecting the rate of polymerization may be mentioned the temperature, the time during which a given sample of furfural is subjected to elevated temperatures, the presence of certain heavy metals such as iron, copper, tin and lead and their salts, and the presence of other substances such as water, oxygen, tars, gums and the like. The polymer itself has been shown to exert an accelerating effect on the rate of polymerization. Free mineral acids, particularly hydrochloric acid, even when present in minute quantities, also have a pronounced accelerating effect on the polymerization rate. Among the metal salts which may be present in the furfural stream, iron salts, particularly ferric chloride, are especially active in promoting the formation of resinous materials. Since variations in these factors will be found in different systems employing furfural, it is obvious that the individual cases must be studied in order to determine the amount of inhibitor necessary to effect the desired results. The optimum quantity of inhibitor is best determined experimentally by making tests on small samples withdrawn from the system. In general, the amount of each component in the inhibitor may vary from about 0.01 to about 0.50 per cent by weight of the furfural. The ratio of pyridine or alkyl pyridine to thiocyanate may vary over extremely wide limits. An exemplary but non-limiting range of ratio of pyridine or alkyl pyridine to thiocyanate is from 10 to 1 down to 1 to 10. The pyridine or alkyl pyridine is often used in larger proportion than the thiocyanate. The condition of the solvent governs, in large part, the quantity of the inhibitor and the ratio of components that will be most effective.

The construction of inhibitor maintained throughout the stream is an important factor in the satisfactory operation of the present invention and may be controlled by either continuous or intermittent addition of small quantities of fresh inhibitor. Certain mechanical losses as well as reaction of both thiocyanate and pyridine with various materials in the stream account for a gradual reduction in inhibitor concentration. In the case of the thiocyanate, for example, some loss is incurred through elimination with heavy polymer which is removed from the system by continuous redistillation or other suitable means. On the other hand, pyridine and certain of its alkyl homologs may be removed overhead since they are more volatile than furfural and, in systems wherein steam distillation is employed, pyridine may be discarded with the aqueous layer. Generally it will be advisable to recover any pyridine that is removed from the system. The amount of inhibitor should not be allowed to build up in the stream above the range which has been determined as suitable in any given case, and ordinarily the total quantity should not exceed 1.0 per cent by weight of the furfural. The presence of an excess of inhibitor accelerates rather than retards the polymerization rate. At elevated temperatures it is possible that a reaction occurs between the inhibitor and furfural although no evidence of such activity is observed when the concentration is maintained within the preferred limits of the invention.

According to the process of our invention the addition of the mixed inhibitors will generally effect a reduction in the polymerization rate of furfural from about 30 per cent to about 95 per cent or higher and in some cases substantially complete reduction is accomplished. The small quantities of polymer which gradually accumulate are then removed by any suitable means such as continuous redistillation. Through the use of our inhibitors the replacement costs of the solvent are kept at a minimum and the operating expense attendant to the redistillation process becomes of minor importance. In addition to the removal of heavy polymer, the redistillation process also serves as a means of preventing the accumulation of spent inhibitor which is removed with the heavy polymer bottoms. The inhibitor removed in this way contains relatively larger quantities of the thiocyanate component and, therefore, any fresh inhibitor added to the stream must be richer in thiocyanate.

The following examples are included to further illustrate the present invention; however, it is not intended that they be interpreted as limitations of the scope of the invention. The parts are by weight.

*Example I*

A mixture comprising 0.02 part of sodium thiocyanate and 0.1 part of pyridine was added to 100 parts of a furfural sample obtained from the recirculating stream in a commercial extractive distillation unit employing this solvent for the separation of n-butane from n-butenes. The furfural contained 5 per cent by weight of water. Portions of this mixture were placed in a series of glass tubes, the air was replaced by nitrogen and the tubes sealed and maintained at a constant temperature of 260° F. Tubes were removed at intervals, cooled and opened and the non-volatile polymer determined by a rapid vacuum distillation method carried out under carefully controlled conditions. The method comprises the rapid distillation of substantially all the furfural at temperatures not to exceed 212° F., the removal of traces of volatile matter by suitable means and weighing of the residue. The net increase in the tarry, non-volatile residue was determined by comparison of the polymer formed in each tube with that present in a sample of the furfural-thiocyanate-pyridine mixture immediately after its preparation. The tabulation which follows shows the per cent polymer formed over a 96-hour period in both inhibited and uninhibited samples and demonstrates the prolonged activity of the inhibitor.

| Hours at 260° F. | Per Cent Polymer Formed | | | | Per Cent Reduction in Polymerization Rate |
|---|---|---|---|---|---|
| | Inhibited Furfural | | Uninhibited Furfural | | |
| | Net Total | Rate Per Day | Net Total | Rate Per Day | |
| 20 | 0.04 | 0.048 | 0.12 | 0.14 | 66 |
| 48 | 0.09 | 0.045 | 0.26 | 0.13 | 65 |
| 72 | 0.13 | 0.043 | 0.37 | 0.12 | 64 |
| 96 | 0.18 | 0.045 | 0.47 | 0.12 | 63 |

Example II

To 100 parts of furfural obtained from an extractive distillation system were added 0.05 part of potassium thiocyanate and 0.10 part pyridine. The furfural sample contained approximately 5 per cent water. When the mixture was allowed to polymerize over a 48-hour period in sealed glass tubes at 290° F. and the samples analyzed at intervals according to the procedure described in Example I, the rate of polymerization was found to be 0.10 weight per cent of the furfural per day. A similar series of tests performed on a sample of the furfural without the inhibitor resulted in a polymerization rate of 0.31 per cent. Therefore, the inhibitor effected a reduction in the polymerization rate of 68 per cent.

Example III

Four parallel series of tests were carried out on a freshly distilled furfural sample which contained 0.03 per cent by weight of ferric chloride, 0.0036 per cent hydrogen chloride and 5.0 per cent water. The inhibitors employed were potassium thiocyanate, pyridine and a mixture of potassium thiocyanate and pyridine, respectively. The fourth test was run on an uninhibited sample. The procedure of Example I was followed and the non-volatile residue determined by the rapid vacuum distillation technique. The tabulation which follows shows the polymerization rate using the three inhibitors contrasted with the value obtained on the untreated sample.

|  | 0.1 Part KSCN | 0.025 Part $C_5H_5N$ | 0.1 Part KSCN+ 0.025 Part $C_5H_5N$ | Uninhibited Sample |
|---|---|---|---|---|
| Temperature, °F | 260 | 260 | 260 | 260 |
| Polymerization Time, Hours | 60 | 60 | 60 | 60 |
| Per Cent Furfural Polymerized Per Day | 0.28 | 0.29 | 0.13 | 1.38 |
| Per Cent Reduction of Polymerization Rate | 80 | 79 | 91 |  |

Example IV

To 100 parts of a distilled furfural sample containing 0.03 per cent by weight of ferric chloride and 0.0036 per cent by weight of hydrogen chloride were added 5.0 parts water, 0.1 part potassium thiocyanate and 1.0 part pyridine. Aliquot portions of the mixture were placed in glass tubes as in Example I and the procedure described therein was followed. A temperature of 260° F. was maintained throughout the 60-hour test. Determination of the polymerization rate revealed an average value of 0.05 per cent by weight of the furfural per day in contrast to 1.38 per cent in an uninhibited sample. The rate of formation of non-volatile material was reduced 96 per cent when the inhibitor was employed.

Example V

A mixture of 0.02 part potassium thiocyanate and 0.02 part pyridine was added to a mixture of 100 parts of freshly distilled furfural and 5.0 parts water. The furfural contained 0.006 per cent by weight of ferric chloride and 0.0018 per cent of hydrogen chloride. In tests carried out in sealed glass tubes at 260° F., according to the procedure of Example I, polymer formation occurred at the average rate of 0.14 weight per cent of the furfural per day over a 60-hour period. In the absence of an inhibitor the same sample polymerized at the rate of 0.48 weight per cent per day. A reduction of 71 per cent was, therefore, effected through the use of the mixed inhibitor. Tests performed under the same conditions on a carefully purified furfural sample, free from iron and acids, in the absence of an inhibitor, showed a polymerization rate of 0.04 per cent per day. These data reveal the accelerating effect on the polymerization rate when very small quantities of iron and free acids are present and the effectiveness of small amounts of the thiocyanate-pyridine mixture.

Example VI

An inhibitor comprising 0.05 part sodium thiocyanate and 0.10 part pyridine was added to 100 parts of a furfural sample obtained from the circulating stream of a commercial extractive distillation unit employing this solvent in the separation of 1,3-butadiene from n-butenes. The furfural contained approximately 5.0 per cent water and about 0.1 per cent of dissolved light hydrocarbons. The mixture of furfural and inhibitor was placed in a steel cylinder, the air displaced by nitrogen and the temperature held at 260° F. while a pressure of 30 pounds' gage was maintained. Portions of the mixture were withdrawn at intervals and the samples analyzed for non-volatile residue by the rapid vacuum distillation method. The average rate of polymer formation over a 72-hour period was 0.80 weight per cent of the furfural per day as contrasted with 1.21 per cent in a series of tests carried out under identical conditions but without the use of an inhibitor. The reduction in the rate of polymerization accomplished through the use of the sodium thiocyanate-pyridine inhibitor was 34 per cent while a value of only 16 per cent was obtained when 0.1 part of sodium thiocyanate alone was employed.

Example VII

The tests of Example VI were repeated using the same furfural-inhibitor mixture in a steel bomb at 290° F. and under a pressure of 60 pounds' gage. Periodic withdrawal of samples for analysis revealed the rate of polymer formation to be 0.9 per cent of the furfural per day while an uninhibited sample gave a value of 1.80 per cent. A reduction of 50 per cent in the rate of polymerization was accomplished.

Example VIII

In order to study the inhibiting action of a mixture of 2-methyl pyridine and sodium thiocyanate on the rate of furfural polymerization, 0.1 part of the pyridine and 0.02 part of the thiocyanate were added to 100 parts of a furfural sample withdrawn from a commercial extractive distillation unit. The furfural contained approximately 5.0 per cent water. The procedure of Example I was followed and the temperature was held at 260° F. The inhibited sample showed an average polymerization rate of 0.11 weight per cent of the furfural per day over a 46-hour period while a similar test on an uninhibited sample gave a value of 0.21 per cent. The same tests continued over a 96-hour period gave polymerization rates of 0.08 per cent and 0.18 per cent, respectively. A reduction of 48 per cent in the polymerization rate was realized during the shorter test period while a 43 per cent reduction was accomplished during the longer period.

*Example IX*

In the manufacture of butadiene by two-stage catalytic dehydrogenation of normal butane, a recovery system embodying a normal butene furfural extractive distillation column between stages and a 2-butene-butadiene furfural extractive distillation column after the second stage was employed. The solvent consisting of furfural containing 6 weight per cent of dissolved water was fed continuously into the absorber columns at a total rate of 260,000 gallons per hour. After removal of the dissolved unsaturated hydrocarbon from the rich solvent in the strippers associated with the respective absorbers, the lean furfural streams were merged and cooled to 120–130° F. and the major part of the lean solvent was passed to a common furfural surge tank. A sidestream of lean furfural of suitable volume was withdrawn and fed to a furfural rerun unit. The total volume of furfural in the entire system was 225,000 gallons. Under these conditions operations were unsatisfactory because severe corrosion occurred and a considerable quantity of furfural was lost as polymer.

At this time the addition of pyridine and sodium thiocyanate to the circulating furfural-water solvent was begun. These materials were added at the rate of 20 lbs./hr. of pyridine and 4 lbs./hr. of sodium thiocyanate until concentrations of 0.10 weight per cent of pyridine and of 0.02 weight per cent of sodium thiocyanate was reached. The rate of pyridine and sodium thiocyanate addition was then reduced to a quantity sufficient to maintain the concentrations of pyridine and sodium thiocyanate in the solvent approximately at the levels of 0.10 and 0.02 per cent, respectively. This effected a marked reduction in the acidity and polymer content of the furfural and consequently a considerably smaller quantity required to be rerun in order to maintain a predetermined satisfactorily low polymer concentration in the circulating solvent stream. The formation of polymer was reduced approximately 70% by the use of pyridine and sodium thiocyanate in accordance with this example.

We claim:

1. A method of inhibiting the polymerization of furfural which comprises incorporating therein minor proportions of an inorganic thiocyanate and a compound selected from the group consisting of pyridine and its alkyl homologs.

2. A method of inhibiting the polymerization of furfural which comprises incorporating therein from 0.01 to 0.50 per cent of an alkali metal thiocyanate and from 0.01 to 0.50 per cent of a compound selected from the group consisting of pyridine and its alkyl homologs.

3. A method of inhibiting the polymerization of furfural which comprises incorporating therein a minor proportion of an alkali metal thiocyanate and a minor proportion of pyridine.

4. A method of inhibiting the polymerization of furfural which comprises incorporating therein from 0.01 to 0.50 per cent of an alkali metal thiocyanate and from 0.01 to 0.50 per cent of pyridine.

5. A method of inhibiting the polymerization of furfural which comprises incorporating therein from 0.01 to 0.50 per cent of an alkali metal thiocyanate and from 0.01 to 0.50 per cent of picoline.

6. A method of inhibiting the polymerization of furfural which comprises incorporating therein from 0.01 to 0.50 per cent of an alkali metal thiocyanate and from 0.01 to 0.50 per cent of lutidine.

7. An improved selective solvent comprising furfural in intimate admixture with minor proportions of an alkali metal thiocyanate and of a compound selected from the group consisting of pyridine and its alkyl homologs.

8. An improved selective solvent comprising furfural and from 0.01 to 0.50 per cent of an alkali metal thiocyanate and from 0.01 to 0.50 per cent of a compound selected from the group consisting of pyridine and its alkyl homologs.

9. An improved selective solvent comprising furfural in intimate admixture with from 0.01 to 0.50 per cent of an alkali metal thiocyanate and from 0.01 to 0.50 per cent of pyridine.

10. A improved selective solvent consisting essentially of furfural containing dissolved water in amount ranging from 1 per cent up to saturation and from 0.01 to 0.50 per cent of an alkali metal thiocyanate and from 0.01 to 0.50 per cent of a compound selected from the group consisting of pyridine and its alkyl homologs.

11. An improved selective solvent consisting essentially of furfural containing dissolved water in amount ranging from 1 per cent up to saturation and from 0.01 to 0.50 per cent of an alkali metal thiocyanate and from 0.01 to 0.50 per cent of pyridine.

12. An improved selective solvent consisting essentially of furfural containing dissolved water in amount ranging from 1 per cent up to saturation and from 0.01 to 0.50 per cent of an alkali metal thiocyanate and from 0.01 to 0.50 per cent of 2-methyl pyridine.

WALTER A. SCHULZE.
JOHN C. HILLYER.

REFERENCES CITED

The following references are of record in the file of this patent:

UNITED STATES PATENTS

| Number | Name | Date |
|---|---|---|
| 2,241,175 | Barnes | May 6, 1941 |
| 2,267,309 | Senkus | Dec. 23, 1941 |
| 2,293,724 | Faerber | Aug. 25, 1942 |
| 2,382,207 | Comstock et al. | Aug. 14, 1945 |
| 2,384,238 | Comstock et al. | Sept. 4, 1945 |